United States Patent
Karlsson et al.

(10) Patent No.: US 11,969,865 B2
(45) Date of Patent: Apr. 30, 2024

(54) METHOD, AN ELECTRIC TOOL AND COMPUTER PROGRAM FOR SETTING AN OPERATING MODE AND/OR ASSOCIATING RESULT VALUES OF AN ELECTRIC TOOL

(71) Applicant: ATLAS COPCO INDUSTRIAL TECHNIQUE AB, Stockholm (SE)

(72) Inventors: Robin Karlsson, Stockholm (SE); Jakob Lindström, Enskede (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 331 days.

(21) Appl. No.: 17/415,451

(22) PCT Filed: Nov. 13, 2019

(86) PCT No.: PCT/EP2019/081112
§ 371 (c)(1),
(2) Date: Jun. 17, 2021

(87) PCT Pub. No.: WO2020/126234
PCT Pub. Date: Jun. 25, 2020

(65) Prior Publication Data
US 2022/0024007 A1    Jan. 27, 2022

(30) Foreign Application Priority Data
Dec. 19, 2018 (SE) .................... 1830367-7

(51) Int. Cl.
*B25B 23/147* (2006.01)
*G05B 19/418* (2006.01)
*H04W 4/80* (2018.01)

(52) U.S. Cl.
CPC ...... *B25B 23/147* (2013.01); *G05B 19/41805* (2013.01); *G05B 19/4183* (2013.01); *H04W 4/80* (2018.02); *G05B 2219/45127* (2013.01)

(58) Field of Classification Search
CPC ............ G05B 19/042; G05B 19/41805; G05B 19/4183; G05B 2219/45127; B25B 23/14;
(Continued)

(56) References Cited

U.S. PATENT DOCUMENTS 7,055,233 B1 *   6/2006   Hofer ...................... G01S 5/22
                                                            29/430
10,744,605 B2 *  8/2020   Thorwarth ............ B23P 21/004
(Continued)

FOREIGN PATENT DOCUMENTS

| JP | 2006155453 A | 6/2006 |
| JP | 2006302046 A | 11/2006 |
| JP | 2016172605 A | 9/2016 |

OTHER PUBLICATIONS

International Search Report (ISR) dated Feb. 13, 2020 issued in International Application No. PCT/EP2019/081112.
(Continued)

*Primary Examiner* — Thomas M Wittenschlaeger
(74) *Attorney, Agent, or Firm* — Holtz, Holtz & Volek PC

(57) ABSTRACT

The present disclosure relates to a method and an electric tool for setting an operating mode and/or associate result values of an electric tool. The method comprising the steps of. Detecting at least one radio signal from at least one radio tag positioned on or in relation to an object to be processed, wherein the radio tag comprising an identifier associated with the object. Measuring distances between the electric tool and the at least one radio tag based on radio signal time of flight between the electric tool and the at least one radio tag. Selecting a first radio tag based on the distances. The first radio tag comprising a first identifier. And setting an operating mode of the electric tool based on the first identifier and/or associate result values of the processing steps performed by the electric tool with the first identifier.

17 Claims, 2 Drawing Sheets

(58) Field of Classification Search
CPC ...... B25B 23/147; H04W 4/80; B23P 19/066; Y02P 90/02
See application file for complete search history.

(56) References Cited

U.S. PATENT DOCUMENTS

2015/0018999 A1* 1/2015 Lee .................. G05B 19/41805
  700/114
2016/0363663 A1* 12/2016 Mindell ................ G01S 5/0247
2019/0056507 A1* 2/2019 Pineau ............... G05B 19/4185

OTHER PUBLICATIONS

Written Opinion dated Feb. 13, 2020 issued in International Application No. PCT/EP2019/081112.
Japanese Office Action (and an English language translation thereof) dated Feb. 26, 2024, issued in counterpart Japanese Application No. 2021-534692.

* cited by examiner

METHOD, AN ELECTRIC TOOL AND COMPUTER PROGRAM FOR SETTING AN OPERATING MODE AND/OR ASSOCIATING RESULT VALUES OF AN ELECTRIC TOOL

TECHNICAL FIELD

The present disclosure relates to a method, an electric tool, and a computer program for setting an operating mode and/or associating result values of an electric tool.

BACKGROUND

Assembling processes of assembling components into objects are often complex, and care should be taken so that the manufacturing steps of such processes are performed correctly.

In assembling processes, electric tools are often used. It is important that the electric tool is set in the correct operating mode for the object on which the assembling steps should be performed. It is also important that the results of the assembly steps are associated with the object on which they were performed, so that the results of the assembling steps on the object later can be reviewed.

There is therefore a need for an improved solution for setting the correct operating mode of the electric tool and associating the result values of the assembling steps with the object on which the assembling steps were performed.

SUMMARY

It is an object of the invention to address at least some of the problems outlined above, e.g. to ensure that the electric tool is set in the correct operating mode and/or to associate result values of the processing steps performed by the electric tool with the object on which they were performed.

A first aspect of the disclosure relates a method for setting an operating mode and/or associating result values of an electric tool. The method includes (i) detecting at least one radio signal from at least one radio tag positioned on or in relation to an object to be processed, wherein the radio tag has an identifier associated with the object, (ii) measuring distances between the electric tool and the at least one radio tag based on radio signal time of flight between the electric tool and the at least one radio tag, (iii) selecting a first radio tag based on the distances, wherein the first radio tag has a first identifier, and (iv) setting an operating mode of the electric tool based on the first identifier and/or associating result values of the processing steps performed by the electric tool with the first identifier.

A second aspect of the disclosure relates to an electric tool for setting an operating mode and/or associating result values of the electric tool. The electric tool is operative to detect at least one radio signal from at least one radio tag positioned on or in relation to an object to be processed, wherein the radio tag has an identifier associated with the object. The electric tool is further operative to measure distances between the electric tool and the at least one radio tag based on radio signal time of flight between the electric tool and the at least one radio tag. The electric tool selects a first radio tag based on the distances, the first radio tag having a first identifier. And the electric tool sets an operating mode of the electric tool based on the first identifier and/or associates result values of processing steps performed by the electric tool with the first identifier.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided for setting an operating mode of an electric tool based on an identifier associated with an object to be manufactured and/or associating result values of processing steps performed by the electric tool with the identifier.

One example is where individual workpieces are processed together with, among other things, screw joints. When assembling workpieces together with screw joints, it is important that the screw joints are tightened to the correct result value. The result value can for instance be torque and/or angle. The result value often vary depending on the object being processed. It is therefore important that the electric tool is set in the correct operating mode depending on the object being processed. It is also important to associate result values of the processing steps performed by the electric tool with the object on which the processing steps were performed.

One type of prior art solution is a positioning system having several anchors in relation to the object that is being processed. The electric tool in this system is then positioned using the several anchors. The position is then used to set parameters of the electric tool. A disadvantage with this system is that it require several anchors.

With the solution according to exemplary embodiments of the present disclosure, it is possible to easy set an operating mode of an electric tool based only on an identifier of an object to be processed and/or associate result values of the processing steps performed with the electric tool with the identifier.

Figure 1:
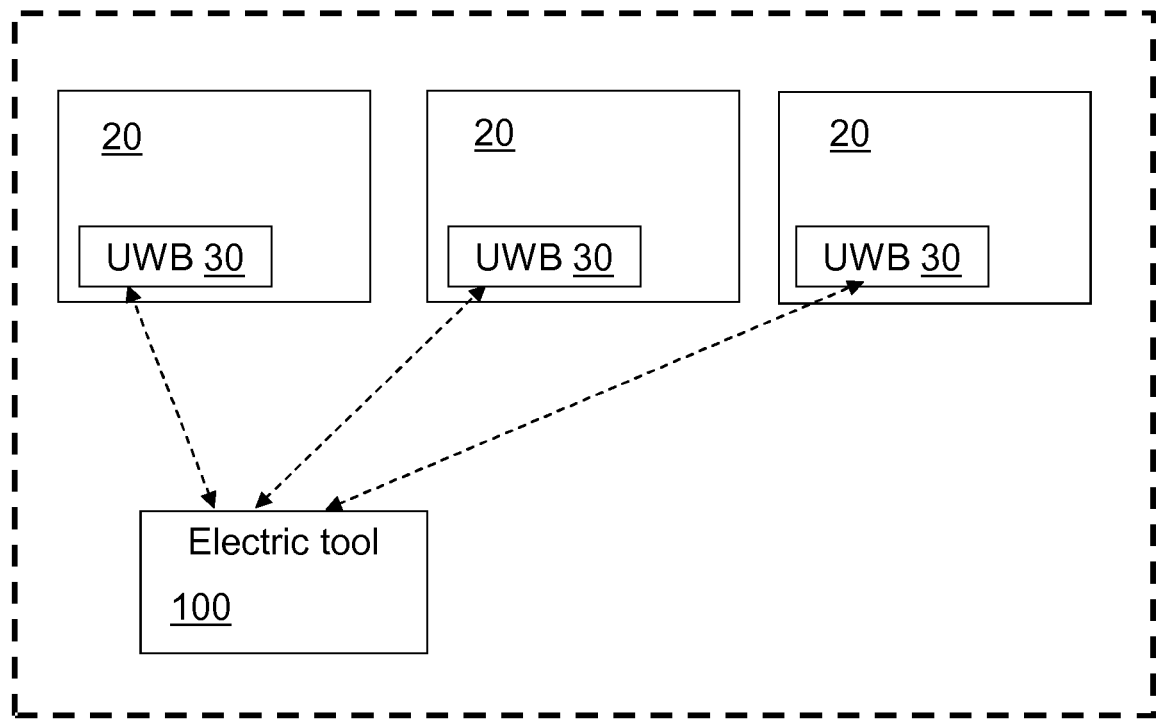
FIG. 1 is a block diagram of an assembly line according to an exemplary embodiment of the present disclosure.

FIG. 1 illustrates a block diagram of an assembly line according to an exemplary embodiment of the present disclosure. The assembly line includes objects to be processed 20. According to an exemplary embodiment of the present disclosure, radio tags 30 are positioned on the different objects 20 to be processed. Each respective radio tag 30 has an identifier. An electric tool 100 is operative to perform processing steps on the objects 20 to be processed based on the identifier and/or associate result values of the processing steps with the identifier.

Figure 3:
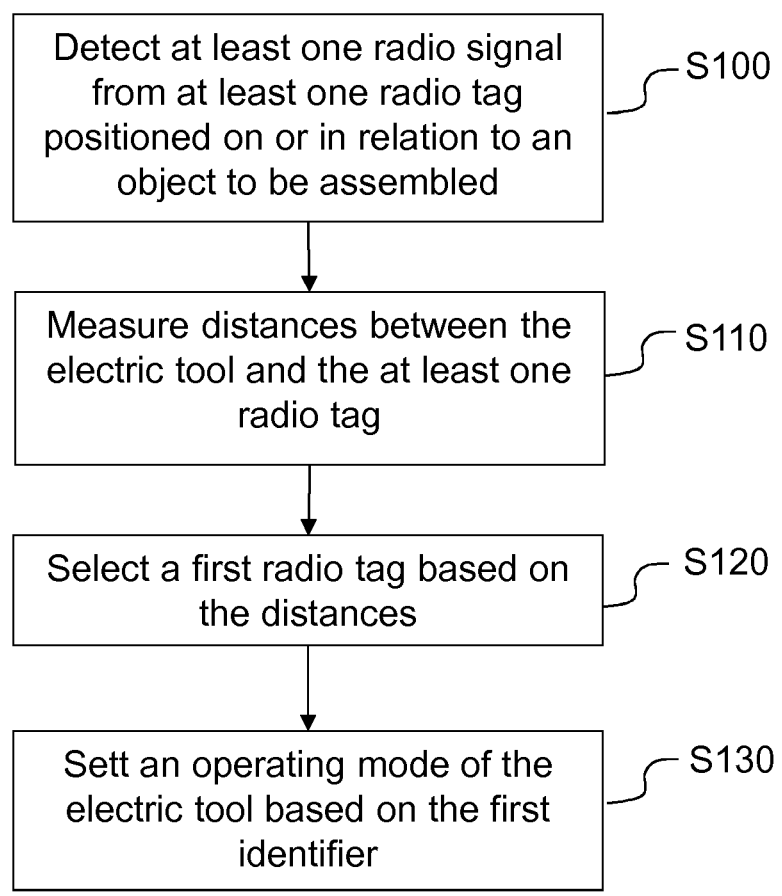
FIG. 3 illustrates a flowchart of a method for performing processing steps on objects to be manufactured.

FIG. 3 illustrates a flowchart of a method for setting an operating mode and/or associating result values of the electric tool 100. The method includes, in step S100, detecting at least one radio signal from at least one radio tag 30 positioned on or in relation to an object 20 to be processed, wherein the radio tag 30 has an identifier associated with the object. Next, in step S110, distances are measured between the electric tool 100 and the at least one radio tag 30 based on radio signal time of flight between the electric tool 100 and the at least one radio tag 30. In step S120, a first radio tag 30 is selected based on the distances, the first radio tag 30 having a first identifier. In step S130, an operating mode of the electric tool 100 is set based on the first identifier and/or result values of the processing steps performed by the electric tool 100 are associated with the first identifier.

In one exemplary embodiment, only one radio signal is detected. This can, for instance, be the case in a factory where large objects are processed. In this embodiment, the distances between the objects are large. Therefore, only one radio signal can be detected.

According to one exemplary embodiment, the radio tag 30 is positioned on the object 20. In another exemplary embodiment, the radio tag 30 is positioned on, for instance, a carrier of the object 20. This embodiment can, for instance, be implemented in a vehicle factory where carriers move the vehicles around from station to station in the assembly line.

In step S110 the distances between the electric tool 100 and the at least one radio tag 30 are measured based on radio signal time of flight between the electric tool 100 and the at least one radio tag 30. Thus, no extra anchors are required in order to measure the distances between the electric tool 100 and the radio tags 30. Only the radio signal time of flight between the electric tool 100 and the at least one radio tag 30 is required in order to measure the distances.

In step S120, a first radio tag 30 is selected based on the distances. In one exemplary embodiment, the closest radio tag 30 is selected in step S120. In this exemplary embodiment, the radio tag 30 closest to the electric tool 100 is selected as the first radio tag 30.

In another exemplary embodiment, step S110 includes measuring distances between at least two radio tags 30 positioned on or in relation to an object 20. In this exemplary embodiment, step S120 includes selecting the first radio tag 30 also based on the distances between the at least two radio tags 30. This embodiment can, for instance, be useful in a situation where the electric tool 100 is positioned in between two objects. In such a situation, the distance to an object may be closer, but by also measuring the distances between the at least two radio tags 30, and the distances between the radio tags 30 and the electric tool 100, the position of the electric tool 100 can be determined.

In step S130, the operating mode of the electric tool 100 is set based on the first identifier and/or result values of the processing steps performed by the electric tool 100 are associated with the first identifier.

According to one exemplary embodiment, the operating mode can be enabling or disabling the tool. This type of operation mode can be advantageous in a case where the electric tool 100 is only allowed to be used at an object associated with a specific identifier. According to another exemplary embodiment, the operating mode can be the processing steps that the electric tool is allowed to perform. In yet another exemplary embodiment, the operating mode can be a specific type of parameter set for the process steps that the electric tool should perform. For instance, the operating mode can be a torque and/or an angle that the electric tool should reach before the process step is considered completed.

In an exemplary embodiment of the present disclosure, result values of the processing steps performed by the electric tool 100 are associated with the first identifier. According to one exemplary embodiment, the result values can be that the process step was performed successfully or not successfully. This type of result value can be advantageous in a case where it is important to keep track of which process steps that have been unsuccessfully performed one or more times. In yet another exemplary embodiment, the result values can be a specific type of result value for the process steps that the electric tool has performed. For instance, the result value can be a torque and/or an angle that the electric tool have reached when a process step is completed.

In one exemplary embodiment of the present disclosure, the object is a vehicle. In this exemplary embodiment, the identifier can be a Vehicle Identification Number (VIN). In one exemplary embodiment, the electric tool 100 is an electric tightening tool 100. In this embodiment, the processing steps may be tightening of a screw of a nut, or a group of screws or nuts. In this embodiment, the result values are at least one tightening parameter. The result values may be a number of rotations, final torque, angle, an indication of OK, or Not OK and similar result values related to tightening. In another exemplary embodiment, the operating mode that is set based on the identifier is a target value of the processing steps that are performed with the electric tool 100.

According to one exemplary embodiment, the radio tags 30 are Ultra-Wideband Radio (UWB) tags. In this exemplary embodiment, the distances between the electric tool 100 and the respective UWB-tags 30 are determined using UWB. According to one exemplary embodiment, a request is sent to each respective UWB-tag 30 for the distance between the electric tool 100 and each respective UWB-tag 30. Then the electric tool 100 selects the UWB-tag 30 based on the distances between the UWB-tags 30 and the electric tool 100.

According to one exemplary embodiment, the UWB-tag 30 that is closest to the electric tool 100 is chosen.

In one exemplary embodiment, the operating mode that is set based on the first identifier is to lock the electric tool 100 tool or to unlock the electric tool 100. One situation where the electric tool 100 can be locked is for instance if all processing steps have already been performed on the object. Then electric tool 100 is locked so that the electric tool 100 cannot perform any more processing steps on the object.

In another exemplary embodiment, the operating mode that is set based on the first identifier is a target parameter of the processing steps that are performed with the electric tool 100. The target parameters for different objects can be different. It is therefore advantageous to be able to set the target parameter of the electric tool 100 based on the identifier.

As mentioned above, in one exemplary embodiment the electric tool 100 is also operative to associate result values of the processing steps performed on the object with the first identifier.

In one exemplary embodiment, the electric tool 100 is an electric tightening tool 100. In this embodiment the processing steps may be tightening of a screw of a nut, or a group of screws or nuts. In this embodiment the result values are at least one tightening parameter. The result values may be a number of rotations, final torque, angle, an indication of OK, or Not OK and similar result values related to tightening.

In one exemplary embodiment the object to be manufactured is a vehicle. In this exemplary embodiment the identifier can be a Vehicle Identification Number (VIN). A vehicle identification number is a unique code, including a serial number, used by the automotive industry to identify individual motor vehicles, towed vehicles, motorcycles, scooters and mopeds.

An advantage of associating result values of the processing steps is that it may be possible to later analyze the result values. It is for example possible for a car manufacturer to provide information about a specific vehicle that has been involved in an accident. It may, for example, be advantageous for the car manufacturer to be able to provide result values about the processing steps when the car left the assembly process.

Referring again to FIG. 1, the present disclosure also relates the electric tool 100 for setting an operating mode and/or associating result values of the electric tool 100. The electric tool 100 is operative to detect at least one radio signal from at least one radio tag 30 positioned on or in relation to an object 20 to be processed. The radio tag 30 has an identifier associated with the object 20. The electric tool 100 is further operative to measure distances between the electric tool 100 and the at least one radio tag 30 based on radio signal time of flight between the electric tool and the at least one radio tag 30. The electric tool 100 selects a first radio tag 30 based on the distances, the first radio tag 30 having a first identifier. The electric tool 100 is operative to set an operating mode of the electric tool 100 based on the first identifier and/or associate result values of the processing steps performed by the electric tool 100 with the first identifier.

According to one exemplary embodiment, the electric tool 100 is operative to select the closest radio tag 30 as the first radio tag 30.

In another exemplary embodiment, the electric tool 100 is further operative to measure distances between at least two radio tags 30 positioned on or in relation to the object 20. In this exemplary embodiment, the electric tool 100 is further operative to select the first radio tag 30 also based on the distances between the at least two radio tags 30. This embodiment can, for instance, be useful in a situation where the electric tool 100 is positioned in between two objects. In such a situation the distance to an object can be closer, but by also measuring the distances between the at least two radio tags 30, and the distances between the radio tags 30 and the electric tool 100, the position of the electric tool 100 can be determined.

According to one exemplary embodiment of the electric tool 100, the identifier is a VIN, Vehicle Identification Number.

In one exemplary embodiment of the electric tool 100 the electric tool 100 is an electric tightening tool 100. In this exemplary embodiment of the electric tool 100, the operating mode may be a tightening parameter value, such as torque and/or angle. In one exemplary embodiment of the electric tool 100, the radio tag is an Ultra-Wideband radio (UWB) tag, or UWB-tag.

Figure 2:
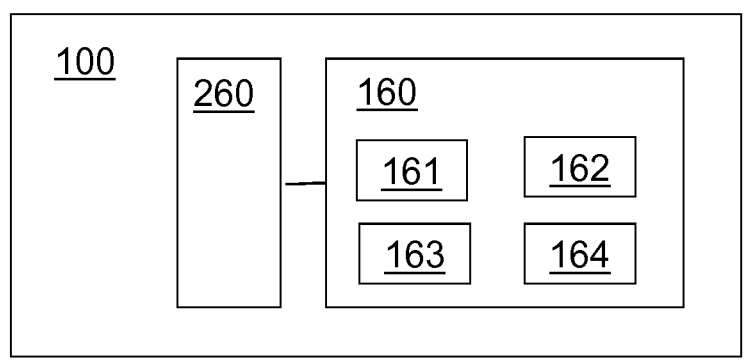
FIG. 2 is block diagram of an exemplary embodiment of an electric tool 100.

FIG. 2 is block diagram of an exemplary embodiment of the electric tool 100. The electric tool 100 includes a processor 160 arranged to control the electric tool 100. The electric tool 100 also includes a memory 260 containing instructions executable by the processor 160. The processor 160 is a Central Processing Unit, CPU, microcontroller, Digital Signal Processor, DSP, or any other suitable type of processor capable of executing computer program code. The memory 260 is a Random Access Memory, RAM, a Read Only Memory, ROM, or a persistent storage, e.g. one or a combination of magnetic memory, optical memory, or solid state memory or even remotely mounted memory.

According to one aspect, the disclosure further relates to a computer program including computer readable code which, when run on the electric tool 100, causes the electric tool 100 to perform any of the aspects of the disclosure described herein.

When the above-mentioned computer program code is run in the processor 160 of the electric tool 100, it causes the electric tool 100 to be operative (i) to detect at least one radio signal from at least one radio tag 30 positioned on or in relation to an object 20 to be processed, wherein the radio tag 30 has an identifier associated with the object 20, (ii) to measure distances between the electric tool and the at least one radio tag 30 based on radio signal time of flight between the electric tool and the at least one radio tag 30, (iii) to select a first radio tag 30 based on the distances, the first radio tag 30 having a first identifier, and (iv) to set an operating mode of the electric tool 100 based on the first identifier and/or associate result values of the processing steps performed by the electric tool 100 with the first identifier.

According to one aspect of the disclosure the processor 160 comprises one or several of:
 a detecting module 161 adapted to detect at least one radio signal from at least one radio tag 30 positioned on or in relation to an object 20 to be processed, wherein the radio tag 30 has an identifier associated with the object 20;
 a measuring module 162 adapted to measure distances between the electric tool and the at least one radio tag 30 based on radio signal time of flight between the electric tool and the at least one radio tag 30;
 a selecting module 163 adapted to select a first radio tag 30 based on the distances, the first radio tag 30 having a first identifier; and
 an operating mode module 164 adapted to set an operating mode of the electric tool 100 based on the first identifier and/or associate result values of the processing steps performed by the electric tool 100 with the first identifier.

The detecting module 161, the measuring module 162, the selecting module 163, and the operating module 164 are implemented in hardware or in software or in a combination thereof. The modules 161, 162, 163, and 164 are according to one aspect implemented as a computer program stored in the memory 260 which runs on the processor 160. The electric tool 100 is further configured to implement all the aspects of the disclosure as described herein.

According to one exemplary embodiment, the electric tool is an electric power tool. According to another exemplary embodiment, the electric tool is an electric tightening tool. According to yet another exemplary embodiment, the electric tool is an electric torque wrench.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory.

The invention claimed is:

1. A method for setting an operating mode and/or associating result values of an electric tool, the method comprising:
    detecting at least one radio signal from at least one radio tag positioned on or in relation to an object to be processed, the radio tag comprising an identifier associated with the object;
    measuring at least one distance between the electric tool and the at least one radio tag based on radio signal time of flight between the electric tool and the at least one radio tag;
    selecting a first radio tag based on the measured at least one distance, the first radio tag comprising a first identifier; and setting an operating mode of the electric tool based on the first identifier and/or associating result values of processing steps performed by the electric tool with the first identifier.

2. The method according to claim 1, wherein the identifier is a VIN (Vehicle Identification Number).

3. The method according to claim 2, wherein the electric tool is an electric tightening tool.

4. The method according to claim 3, wherein the result values are torque and/or angle.

5. The method according to claim 1, wherein the method is performed in an electric tool.

6. The method according to claim 1, wherein the operating mode is a tightening parameter value.

7. The method according to claim 6, wherein the tightening parameter value is torque and/or angle.

8. The method according to claim 1, wherein the radio tag is a UWB (Ultra-Wideband) radio tag.

9. The method according to claim 1, wherein the measuring further comprises measuring at least one distance between at least two radio tags positioned on or in relation to an object to be processed, and wherein the selecting further comprises selecting the first radio tag based on the at least one distance between the at least two radio tags.

10. An electric tool for setting an operating mode and/or associate result values of the electric tool comprising:
   a memory; and
   a processor configured to control the electric tool to:
   detect at least one radio signal from at least one radio tag positioned on or in relation to an object to be processed, the radio tag comprising an identifier associated with the object;
   measure at least one distance between the electric tool and the at least one radio tag based on radio signal time of flight between the electric tool and the at least one radio tag;
   select a first radio tag based on the measured at least one distance, the first radio tag comprising a first identifier; and
   set an operating mode of the electric tool based on the first identifier and/or associate result values of processing steps performed by the electric tool with the first identifier.

11. The electric tool according to claim 10, wherein the identifier is a VIN (Vehicle Identification Number).

12. The electric tool according to claim 10, wherein the electric tool is an electric tightening tool.

13. The electric tool according to claim 10, wherein the operating mode is a tightening parameter value.

14. The electric tool according to claim 13, wherein the tightening parameter value is torque and/or angle.

15. The electric tool according to claim 10, wherein the radio tag is a UWB (Ultra-Wideband) radio tag.

16. The electric tool according to claim 10, wherein the processor is further configured to control the electric tool to measure at least one distance between at least two radio tags positioned on or in relation to an object to be processed, and to select the first radio tag based on the at least one distance between the at least two radio tags.

17. A non-transitory computer-readable storage medium having stored thereon a computer program which is executable by a computer in an electric power tool, to control the electric power tool to perform operations comprising:
   detecting at least one radio signal from at least one radio tag positioned on or in relation to an object to be processed, the radio tag comprising an identifier associated with the object;
   measuring at least one distance between the electric tool and the at least one radio tag based on radio signal time of flight between the electric tool and the at least one radio tag;
   selecting a first radio tag based on the measured at least one distance, the first radio tag comprising a first identifier; and
   setting an operating mode of the electric tool based on the first identifier and/or associating result values of processing steps performed by the electric tool with the first identifier.

* * * * *